Jan. 29, 1929.  
F. C. REILLY  
1,700,449
PRESSURE GAUGE
Filed June 5, 1925
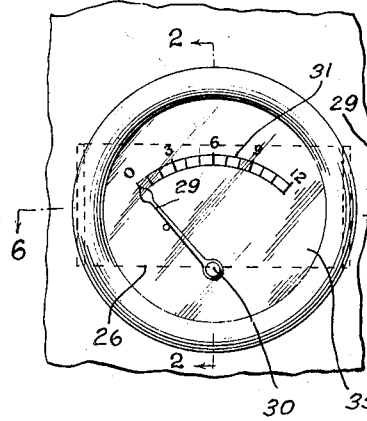
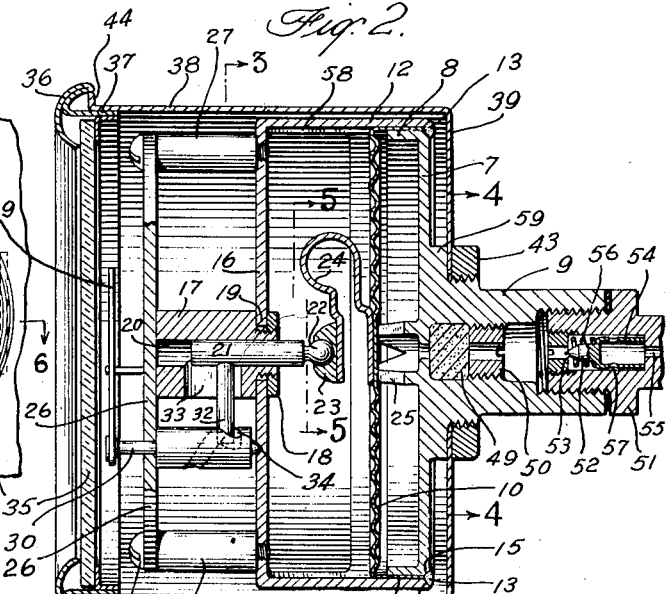
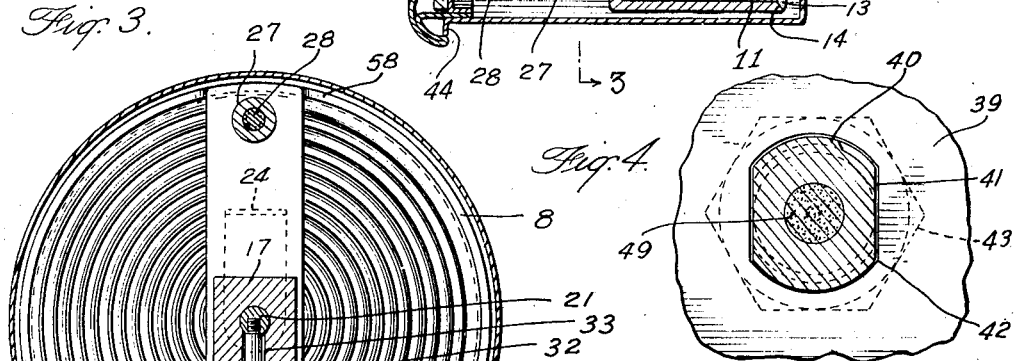
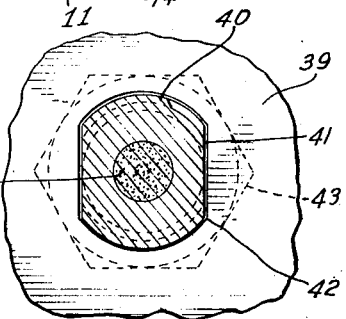
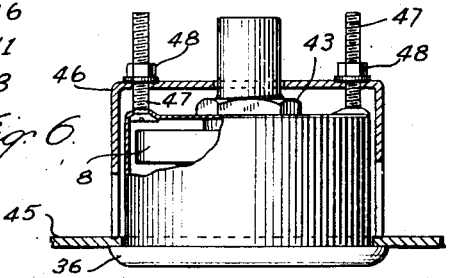
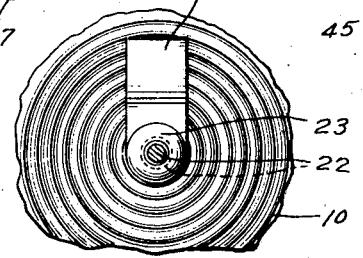
INVENTOR  
Frank C. Reilly  
BY Philip S. McLean  
ATTORNEY Patented Jan. 29, 1929.

1,700,449

UNITED STATES PATENT OFFICE.

FRANK C. REILLY, OF NEW YORK, N. Y.

PRESSURE GAUGE.

Application filed June 5, 1925. Serial No. 35,107.

This invention relates particularly to gauges of the type which are dependent for their operation upon the flexure of a diaphragm subjected to pressure. Such diaphragms, to be sufficiently sensitive, must be relatively light and flexible. These diaphragms must be mounted leak-tight. In so mounting them they are, because of their necessarily frail character, frequently injured or insecurely sealed.

One of the objects of this invention is to provide a tight-fitting mounting for securely sealing the diaphragm and in which the diaphragm will be fully protected against injury.

Other important objects of the invention are to avoid the use of linkage and provide a direct actuation of the indicating element of the gauge by a straight to and fro movement of the diaphragm; to provide in the actuating connections, a simple and effective means of adjustment for setting the indicator in the zero position; to protect the diaphragm from injury by sudden surges or excess pressure; to fix the gauge structure against turning in its casing; and to provide simple means for mounting the gauge on an instrument board or the like which can be set up properly without danger of distorting the diaphragm or delicate parts of the gauge.

The foregoing and other objects are attained by certain novel features of construction, combinations and relations of parts as hereinafter set forth and broadly claimed.

In the drawing accompanying and forming part of the specification, the invention is illustrated in one of its practical commercial forms, but it should be understood that the structure may be modified in various respects without departure from the broad spirit and scope of the invention.

Figure 1 is a broken front elevation of the gauge as applied to an instrument board or the like, showing in dotted lines the arch at the back of the panel by which the gauge is clamped in place.

Figure 2 is an enlarged vertical sectional view as taken on substantially the plane of line 2—2 of Figure 1.

Figure 3 is a transverse sectional view as on substantially the plane of line 3—3 of Figure 2.

Figure 4 is a broken cross sectional view as on the plane of line 4—4 of Figure 2.

Figure 5 is a broken cross section as on line 5—5 of Figure 2.

Figure 6 is a horizontal part sectional view showing the mounting of the gauge and taken partly on the plane of line 6—6 of Figure 1.

The base or body of the gauge illustrated comprises a rigid back plate 7 having a forwardly extending annular flange 8 at the rim of the same and a rearwardly extending hub 9 at the center.

The diaphragm 10 is shown as of corrugated form and as having a rearwardly extending annular flange 11 at the rim of the same fitting over the forwardly extending flange of the back plate.

Surrounding the flange of the diaphragm is a cup 12 and the rearward edge of the diaphragm flange exposed between the edge of the back plate and the rim of the cup is sealed in place by brazing or soldering, as indicated at 13. The edge of the cup is shown as beveled at 14 to form with the reverse bevel or curve 15 at the edge of the back plate, a V-shaped groove or channel to receive the solder or other sealing material.

In the construction described, the flanged rim of the diaphragm is rigidly clamped between the surrounding cup and the flange of the back plate and in addition it is soldered to both these parts and the soldering is effected at a point removed from the active portion of the diaphragm so that a secure joint is effected and the possibility of injuring the diaphragm is avoided. Furthermore, the parts are easily assembled and the joint is fully exposed and accessible for the soldering operation.

The forward wall 16 of the cup constitutes part of a frame for the indicating mechanism, receiving the screw threaded end of a central stud 17 held in place by the lock nut 18. The opening 19 through which the screw threaded end of this stud passes is preferably made large enough to enable the stud being adjusted more or less to adapt it to its related parts.

The stud 17 is shown as having a central bore 20 receiving a plunger 21 formed at its rear end with a ball head 22 seating in a ball socket 23 on the free end of a bent-over, substantially U-shaped yoke 24 which is secured fixedly at the rear to the central portion of the diaphragm. The plunger 21 is thus directly actuated by the diaphragm, the ball and socket affording a pivotal connection by which the plunger is projected and retracted directly in accordance with the movements of the diaphragm.

The yoke 24 is normally rigid so as to accurately transmit the movements of the diaphragm but because of its looped construction, it may be readily bent or deformed, either by a pinching or spreading adjustment, to draw back or to advance the plunger with respect to the diaphragm. Thus the initial position of the plunger may be adjusted with respect to the diaphragm, the diaphragm normally being tensioned in the absence of pressure to rest against the back stop 25.

A dial plate is shown at 26 secured by spacing sleeves 27 and screws 28 in front of the wall 16 and a pointer or gauge finger 29 is shown as carried by a pivot stud 30, journaled in the dial plate 26 and wall 16, said pointer traversing a suitable scale 31 on the face of the dial plate.

Connection between the direct acting plunger 21 and the gauge finger is afforded by a downwardly projecting pin 32 carried by the plunger, operating in a straight guide slot 33 in the stud 17 and engaging a helical cam groove 34 formed in or carried by the arbor of the gauge finger. By this simple construction the backward and forward motions of the plunger are converted into proportionate rotatory movements of the gauge finger.

In the instrument shown the scale and pointer of the gauge are covered over by a glass 35 held in place by a bezel 36 having a rearwardly extending flange 37 fitting into the forward open end of a case 38 which encloses the gauge parts. This case is shown constructed in the form of a forwardly facing cup having a back wall 39 engaged over the hub extension 9 of the base plate.

To secure the case and instrument parts in nonrotative or fixed relation, the hub extension is shown as having a screw threaded portion 40 flattened on opposite sides as at 41 and the back wall 39 of the case is shown as having a correspondingly elongated opening 42 engageable non-rotatively over this screw threaded shank. When the parts are so assembled, a nut 43 is screwed over the shank to fasten the case firmly in such non-rotatable relation. Also in this way the case is secured to the body of the instrument only at the hub where the structure is fairly massive so that shocks to or deformation of the case are not liable to affect the sensitive parts of the instrument, particularly the diaphragm and its supporting structure which are entirely removed from the surrounding case.

For mounting the instrument on a panel or instrument board, the case is shown provided with an annular flange 44 to bear against the front of the panel 45 and an arch shaped yoke 46 of substantially U-form is provided bridging the case and with its ends engaging the back of the panel, said yoke being connected with the back of the case by the screws 47 and nuts 48. It will be seen that the effect of tightening the nuts 48 is to draw the instrument back firmly to its seat in the panel, the outstanding flange 44 at the front of the case limiting this seating movement. With this construction all strain is applied to the case and none of the stress is applied to the working parts of the instrument so that such working parts are protected from injury which might otherwise result from careless treatment in the mounting of the instrument.

To protect the diaphragm from sudden surges of pressure which might have a tendency to injure the same, a body or disc 49 of wool felt or other suitable highly porous material is indicated in Figure 2, held in place within the bore of the hub 9 by a hollow screw plug 50. This plug, in addition to its effect as a flow retarder, serves as a filter to protect the diaphragm from injurious matter and the screw retainer enables ready removal and replacement of the same should that become necessary.

Injury to the diaphragm from excessive pressure is guarded against in the present disclosure by a valve plug 51 screwed in the end of the hub and containing a conical valve 52 cooperating with a valve seat shown as a ring 53 screwed in the forward end of the plug. The rearward end of the valve is shown as enlarged and hollowed to form a bell 54 into which pressure is admitted at the rear from the flow passage 55. Valve 52 is normally held off its seat by a coil spring 56 engaged about the shank of the valve and bearing against the valve seat as an abutment.

The bell or chamber of the valve is perforated as indicated at 57 to permit flow out of the same and past the valve seat under normal conditions. Any excessive pressure, however, has the effect of forcing the hollow valve quickly to its seat and thus shutting off a flow such as might injure the diaphragm or other parts. This so-called safety valve is readily removable from the plug upon unscrewing the valve seat and it will be seen that this valve seat also can be used as a means for adjusting the tension of the spring and thus fixing the point at which the valve will shut off.

The cup member 12 may have its side walls cut away forward of the diaphragm, as indicated at 58, to provide full access to the thrust transmitting yoke 24. In this way, after the case is removed, an instrument may be entered at one side or the other to compress or spread said yoke for the purpose of adjusting the initial position of the gauge finger.

The clamping of the diaphragm flange between the annular shoulder of the back plate and the surrounding wall of the cup member relieves the soldered joint of the pressure on the diaphragm so that this joint can be in fact simply a sealing connection, it not being subjected to any real stresses. This lightly soldered joint can be inexpensively made and without exercise of any special skill, the annular groove or gutter materially facilitating the operation and the location of this groove at the back, giving full and free access.

The spacing of the case from the back plate and the more delicate parts of the instrument carried thereby protects such parts from blows or shocks which otherwise might injure the instrument. The shoulder 59 which spaces the casing in rear of the back plate need only be of sufficient extent to insure clearance between the back plate and the casing under all conditions. The panel engaging flange of the case may be continuous or discontinuous as preferred and it will be obvious that other changes of such a nature may be made within the scope of the invention. The spacing of the back wall of the casing from the diaphragm plate 7 is a material protection to the diaphragm and the more delicate parts because it will be seen that the casing may be materially injured or partially crushed by accidental blows or the like without such blows or forces ever reaching the delicate parts of the instrument. By tightening the hollow screw 50 it will be seen that the porosity of the strainer member 49 may be decreased so as to cause it to act as a stabilizer for preventing sudden surges from acting on the diaphragm and producing sudden shifting of the pointer. This adjustment may be utilized therefore either to retard or to free the action of the pointer.

What is claimed is:

1. In a pressure gauge, a back plate having a forwardly extending flange, a flexible diaphragm having a rearwardly extending flange engaged over the first flange and a ring like member surrounding the diaphragm flange and having a bridge for supporting other parts of the instrument extending diametrically across and connecting opposite sides of the same at a distance spaced in front of the flexible diaphragm.

2. In a pressure gauge, a back plate having a forwardly extending flange, a flexible diaphragm having a rearwardly extending flange engaged over the first flange and a ring like member surrounding the diaphragm flange, the edge of said member and the opposing portion of the back plate forming between them an annular gutter with the edge of the diaphragm flange at the base of such gutter, and soldering material in said gutter sealing the diaphragm flange to the members between which it is held.

3. In a pressure gauge, a supporting plate, a flexible diaphragm having a flange extending over said plate with its edge exposed at the rear of the plate, a member surrounding said flange and forming with the rear edge of the plate an annular gutter in which the flange of the diaphragm is centered and sealing material engaged over the exposed edge of the flange between the adjacent portions of the back plate and surrounding member.

4. In a pressure gauge, a rigid back plate having a pressure inlet at the center and a forwardly extending flange at the rim of the same, a rearwardly facing cup engaged over the flange and a diaphragm within the cup having a rearwardly extending flange rigidly clamped between the overlapping portions of the cup and plate flange and indicating means mounted on the forward face of the back wall of said cup.

5. In a pressure gauge, a rigid back plate having a pressure inlet at the center and a forwardly extending flange at the rim of the same, a rearwardly facing cup engaged over the flange and a diaphragm within the cup having a rearwardly extending flange rigidly clamped between the overlapping portions of the cup and plate flange, the diaphragm flange being exposed at the rear of the back plate and said exposed edge being soldered in such relation.

6. In a pressure gauge, a back plate having an annular shoulder, a cup engaged over said shoulder, a diaphragm within the cup having an annular flange clamped between the shoulder and the surrounding wall of the cup and indicating mechanism supported by the cup in front of the diaphragm, the side wall of the cup being cut away in front of the diaphragm and an adjustable link connected with the diaphragm and exposed through said cut away portion of the cup.

7. In a pressure gauge, a back plate having an annular shoulder, a cup engaged over said shoulder, a diaphragm having a flange secured between said shoulder and surrounding portion of the cup, a guide supported by the cup in front of the diaphragm, a plunger slidably mounted in said guide and connected with the diaphragm and indicating means actuated by said plunger and also supported by the cup.

8. A pressure gauge having a pressure chamber and a fluid passage opening thereinto, a valve seat in said passage and a valve for cooperation with said seat having a hollow stem open at the rear to the pressure flow entering the passage, said hollow stem entirely covering the entry of the passage but perforated for passage of the normal flow therethrough, a spring for normally holding the valve off its seat and said valve seat being carried by a screw ring adjustably seated in the fluid passage and forming an abutment for the spring, whereby the seating of the valve at various pressures may be predetermined by the adjustment of said valve seat member.

9. A pressure gauge having an inlet, a plug engageable in said inlet having a bore with a fluid inlet at the end of the same, a valve operating in said bore and having a bell covering the fluid inlet, a valve seat screwed in the end of the plug over said valve and a spring interposed between said valve seat and the valve, said valve seat being adjustable by screwing the same in the end of the plug to regulate the force of the spring and hence the pressure which will force the valve to its seat.

10. In an instrument of the character disclosed, a back plate having a shoulder at the rear of the same, a casing enclosing the back plate having an end wall engaged with said shoulder and means for thus securing said end wall whereby the casing is spaced from the back plate, the casing having a panel engaging flange at the front of the same, a yoke for engaging the back of a panel having a portion arched about the casing and screw connections between the back of the yoke and the end wall of the casing at the sides of the spacing shoulder.

In witness whereof, I have hereunto set my hand this 27th day of May, 1925.

FRANK C. REILLY.